US010026068B2

(12) United States Patent
Kanayama

(10) Patent No.: US 10,026,068 B2
(45) Date of Patent: Jul. 17, 2018

(54) CHARGING FEE PAYMENT SYSTEM AND TARGET APPARATUS USED IN THE SAME

(71) Applicant: DENSO CORPORATION, Kariya, Aichi-pref. (JP)

(72) Inventor: Mitsuhiro Kanayama, Takahama (JP)

(73) Assignee: DENSO CORPORATION, Kariya (JP)

( * ) Notice: Subject to any disclaimer, the term of this patent is extended or adjusted under 35 U.S.C. 154(b) by 592 days.

(21) Appl. No.: 13/762,434

(22) Filed: Feb. 8, 2013

(65) Prior Publication Data
US 2013/0218756 A1 Aug. 22, 2013

(30) Foreign Application Priority Data

Feb. 22, 2012 (JP) .................................. 2012-36549

(51) Int. Cl.
G06Q 40/08 (2012.01)
G06Q 20/14 (2012.01)
G06Q 20/08 (2012.01)
G07F 15/00 (2006.01)
G07F 17/00 (2006.01)

(52) U.S. Cl.
CPC ......... G06Q 20/145 (2013.01); G06Q 20/085 (2013.01); G07F 15/003 (2013.01); G07F 17/0021 (2013.01)

(58) Field of Classification Search
USPC ........................................ 705/1.1, 7.11, 7.44
See application file for complete search history.

(56) References Cited

U.S. PATENT DOCUMENTS

| 6,323,775 B1 | 11/2001 | Hansson |
| 8,368,346 B2 * | 2/2013 | Batson .................. H02J 7/0045 320/103 |
| 2010/0001687 A1 * | 1/2010 | Watanabe ..................... 320/109 |
| 2010/0145540 A1 * | 6/2010 | McKenna ..................... 700/295 |

(Continued)

FOREIGN PATENT DOCUMENTS

| JP | 2003-506995 A | 2/2003 |
| JP | 2004-246518 A | 9/2004 |

(Continued)

OTHER PUBLICATIONS

Office Action dated Jan. 21, 2014 in corresponding JP Application No. 2012-036549 (with English translation).

Primary Examiner — Akiba K Allen

(57) ABSTRACT

A charging fee payment system is used for a payment process for a payment of a charging fee to charge a target apparatus with a charging apparatus. The target apparatus includes a memory, a controller, and a communication section. When the charging apparatus does not have a function to communicate with an external server that performs the payment process, the memory stores an unique ID code of the charging apparatus and electricity usage data indicative of the amount of electricity used by the charging apparatus to charge the target apparatus. The controller allows the target apparatus to be charged with the charging apparatus on a condition that the ID code remains stored in the memory. When the communication section becomes able to communicate with the external server, the communication section sends the ID code and the electricity usage data stored in the memory to the external server.

22 Claims, 3 Drawing Sheets

(56) References Cited

U.S. PATENT DOCUMENTS

| | | | |
|---|---|---|---|
| 2010/0161517 A1 | 6/2010 | Littrell | |
| 2011/0161143 A1* | 6/2011 | Tajima | G01R 22/10 705/14.1 |
| 2012/0286730 A1* | 11/2012 | Bonny | B60L 11/1827 320/109 |
| 2013/0099744 A1* | 4/2013 | Falk et al. | 320/109 |
| 2013/0127416 A1* | 5/2013 | Karner | G06Q 20/102 320/109 |
| 2013/0313895 A1* | 11/2013 | Asselin et al. | 307/9.1 |

FOREIGN PATENT DOCUMENTS

| | | |
|---|---|---|
| JP | 2008-065635 A | 3/2008 |
| JP | 2009-129384 A | 6/2009 |
| JP | 2010-017007 A | 1/2010 |
| JP | 2010-079456 A | 4/2010 |
| JP | 2010-146568 A | 7/2010 |
| JP | 2010-178450 A | 8/2010 |
| JP | 2011-083156 A | 4/2011 |
| JP | 2011-154525 A | 8/2011 |
| JP | 2012-027594 A | 2/2012 |

\* cited by examiner

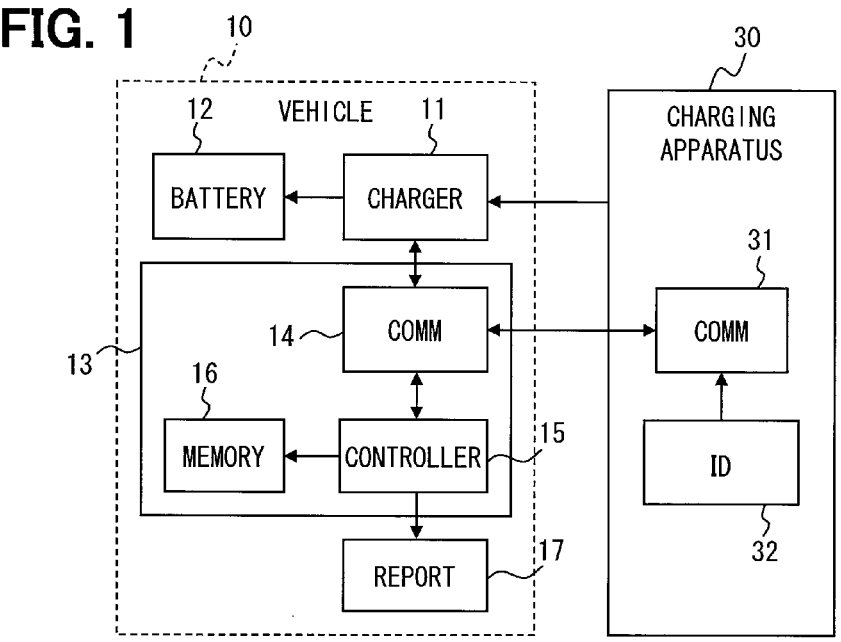
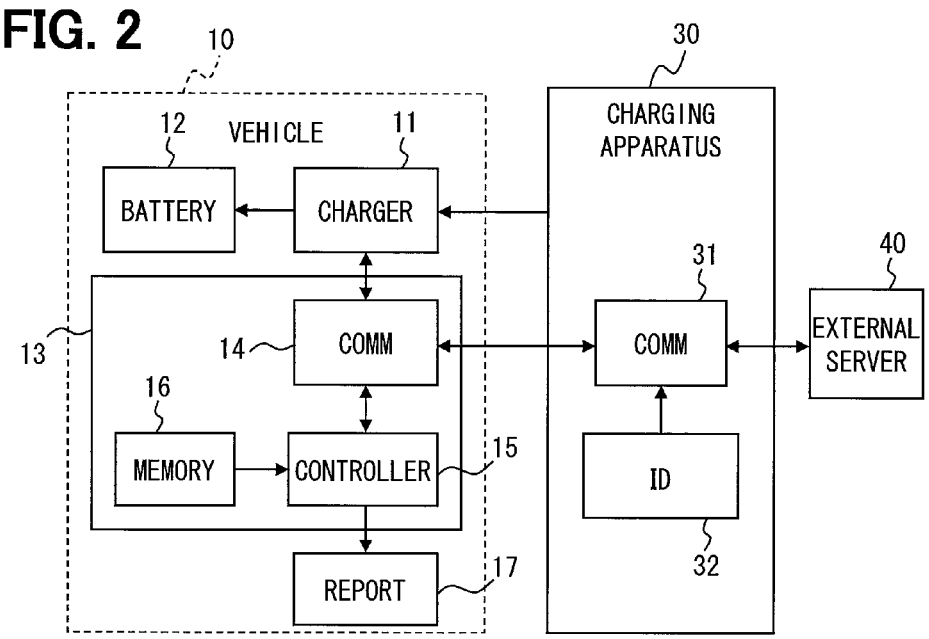

CHARGING FEE PAYMENT SYSTEM AND TARGET APPARATUS USED IN THE SAME

CROSS REFERENCE TO RELATED APPLICATION

This application is based on Japanese Patent Application No. 2012-36549 filed on Feb. 22, 2012, the contents of which are incorporated herein by reference.

FIELD

The present disclosure relates to a charging fee payment system used for a payment process for a payment of a charging fee to charge a target apparatus with a charging apparatus and also relates to the target apparatus.

BACKGROUND

JP-A-2009-129384 discloses a method of calculating a charging fee to charge an electric vehicle. In the method, an authentication process to allow the charging is performed based on identification (ID) card such as a driver's license card or the like. The amount of electricity used to charge the electric vehicle at home and the amount of electricity used to charge the electric vehicle at an external charging apparatus installed at, for example, a super market, a department store, a parking area, or a gas station are separately stored in a database of a system of an electric power company. The charging fee for the amount of electricity used at home and at the charging station are calculated based on the type of a contract between a user and the power company and then collectively charged to the user.

In the conventional method, the charging apparatus needs to send user ID information, which identifies a user who uses the charging apparatus to charge the electric vehicle, and electricity usage data, which indicates the amount of electricity used in the charging apparatus to charge the electric vehicle, to the system of the power company. That is, the conventional method requires that every charging apparatus has a communication function to communicate with the system of the power company. Therefore, the cost of manufacturing and installing the charging apparatus may be increased, and a place where the charging apparatus is installed may be limited. As a result, the widespread use of the charging apparatus 30 may be hindered.

SUMMARY

In view of the above, it is an object of the present disclosure to provide a charging fee payment system available for a payment process for a payment of a charging fee to charge a target apparatus with a charging apparatus, even when the charging apparatus does not have a communication function to communicate with an external server that performs the payment process. It is another object of the present disclosure to provide the target apparatus used in the charging fee payment system.

According to an aspect of the present disclosure, a charging fee payment system is used for a payment process for a payment of a charging fee to charge a target apparatus with a charging apparatus. The target apparatus includes a memory section, a controller, and a communication section. When the charging apparatus does not have a communication function to communicate with an external server that performs the payment process, the memory section stores an unique identification (ID) code of the charging apparatus and electricity usage data indicative of the amount of electricity used by the charging apparatus to charge the target apparatus. The controller allows the target apparatus to be charged with the charging apparatus on a condition that the ID code remains stored in the memory section. When the communication section becomes enable to communicate with the external server, the communication section reads the ID code and the electricity usage data from the memory and sends the ID code and the electricity usage data to the external server. The external server performs the payment process based on the ID code and the electricity usage data sent from the communication section.

BRIEF DESCRIPTION OF THE DRAWINGS

The above and other objects, features and advantages of the present disclosure will become more apparent from the following detailed description made with reference to the accompanying drawings. In the drawings:

FIG. 1 is a block diagram illustrating a charging fee payment system according to an embodiment of the present disclosure when a charging apparatus does not have a communication function to communicate with an external server;

FIG. 2 is a block diagram illustrating the charging fee payment system when the charging apparatus has the communication function to communicate with the external server;

DETAILED DESCRIPTION (Embodiment)

Figure 3:
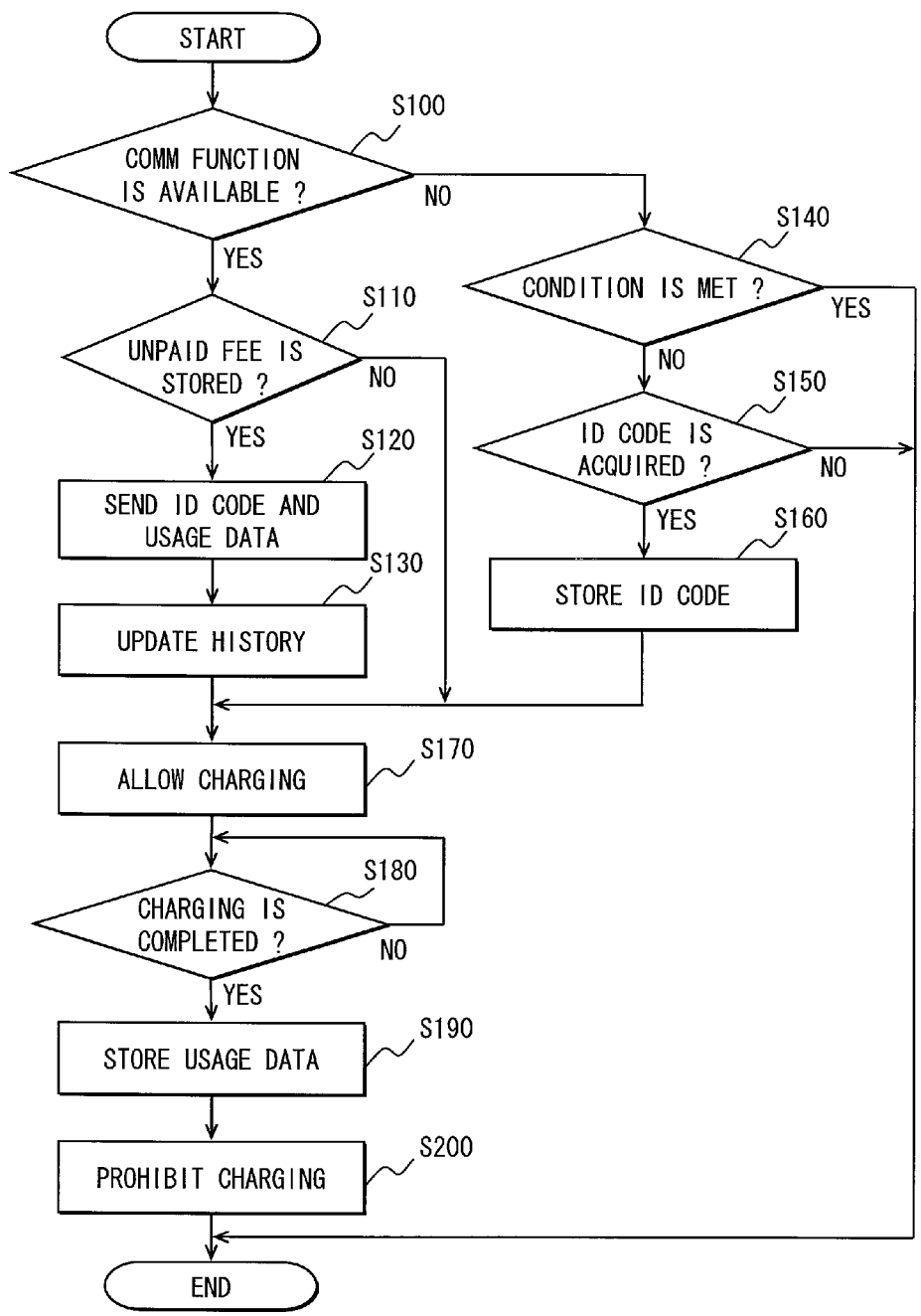
FIG. 3 is a flowchart of a control process performed by a controller of an electric vehicle charged by the charging apparatus.

A charging fee payment system according to an embodiment of the present disclosure is described below with reference to FIGS. 1-3. The charging fee payment system is used for payment of a charging fee to charge a battery of an electric vehicle, such as a plug-in hybrid vehicle, which runs with an electric motor powered by the battery.

As shown in FIG. 1, an electric vehicle 10 as a target apparatus to be charged includes an electric motor (not shown) and a rechargeable battery 12 for storing power. The electric motor is driven by the power stored in the battery 12 and thus allows the electric vehicle 10 to run. The electric vehicle 10 can include another power source, such as an internal combustion engine, to run in addition to an electric motor. That is, the electric vehicle 10 can be a hybrid electric vehicle.

Even if the electric vehicle 10 has a regenerative braking function to recoup some of energy lost during braking, the power stored in the battery 12 is reduced as the electric vehicle 10 runs. The electric vehicle 10 has a charger 11 to control charging of the battery 12. When the electric vehicle 10 is connected through a charging cable to a charging apparatus 30 as a charging station to charge the battery 12 of the electric vehicle 10, the charger 11 serves as an interface between the charging apparatus 30 and the battery 12. The charger 11 controls a charging current to charge the battery 12 in accordance with a state of charge (SOC) of the battery 12. When the battery 12 is fully charged, the charger 11 stops the charging of the battery 12. Further, as described in detail later, the charger 11 allows and prevents the charging of the battery 12 in accordance with a charging enable command from a communication section 13.

The communication section 13 includes a communication device 14 that communicates with a communication device 31 of the charging apparatus 30. Through the communication with the communication device 31 of the charging apparatus 30, the communication section 13 acquires information indicating whether the charging apparatus 30 has a communication function to communicate with an external server 40 that performs a payment process for the payment of the charging fee. If the charging apparatus 30 does not have such a communication function, the communication section 13 acquires a unique identification (ID) code of the charging apparatus 30.

FIG. 1 illustrates a block diagram of the charging fee payment system for the first case where the charging apparatus 30 does not have the communication function to communicate with the external server 40. In the first case, the charging apparatus 30 has an ID code memory 32 to transmit the ID code of the charging apparatus 30 to the communication section 13 of the electric vehicle 10. As a preparation for charging the battery 12, when the electric vehicle 10 is connected to the charging apparatus 30, the communication device 31 of the charging apparatus 30 reads the ID code of the charging apparatus 30 from the ID code memory 32 and transmits the ID code to the communication section 13.

The communication between the communication device 14 of the communication section 13 and the communication device 31 of the charging apparatus 30 can be either wireless or wired through the charging cable connected between the charging apparatus 30 and the charger 11.

A controller 15 of the communication section 13 determines, based on the information acquired from the charging apparatus 30, whether to allow the battery 12 to be charged. If the controller 15 allows the battery 12 to be charged, the controller 15 supplies the charging enable command to the charger 11. In an example shown in FIG. 1, the controller 15 supplies the charging enable command to the charger 11 through the communication device 14. Alternatively, the controller 15 can supply the charging enable command directly to the charger 11 without the communication device 14.

As described in detail later, in the first case where the charging apparatus 30 does not have the communication function to communicate with the external server 40, the controller 15 supplies the charging enable command to the charger 11 on a condition that the ID code acquired from the charging apparatus 30 is stored in a memory 16 of the communication section 13.

The memory 16 is a non-volatile memory and retains stored information even when the electric vehicle 10 is powered off. In addition to the ID code of the charging apparatus 30, the memory 16 stores electricity usage data indicative of the amount of electricity used in the charging apparatus 30 to charge the battery 12. The electricity usage data is generated in the charging apparatus 30 and sent to the communication section 13 of the electric vehicle 10. Alternatively, the electricity usage data can be generated in the charger 11 of the electric vehicle 10 and stored in the memory 16.

When the communication section 13 of the electric vehicle 10 becomes able to communicate with the external server 40, the ID code and the electricity usage data stored in the memory 16 are transmitted together to the external server 40 so that the external server 40 can perform the payment process for the payment of the charging fee. For this reason, the ID code and the electricity usage data indicative of the amount of electricity used in the charging apparatus 30 having the same ID code are stored in association with each other in the memory 16.

A vehicle ID code of the electric vehicle 10 or a user ID code of a user of the electric vehicle 10 is transmitted to the external server 40 along with the ID code and the electricity usage data. In the external server 40, a person (natural person or artificial person) to whom the charging fee should be charged is identified based on the vehicle ID code the user ID code.

Further, when the ID code and the electricity usage data are stored in the memory 16 so that the battery 12 can be charged, the controller 15 determines whether a predetermined condition is met in an unsent state where the ID code and the electricity usage data stored in the memory 16 remain unsent to the external server 40. For example, the predetermined condition can be met when the amount of electricity indicated by the electricity usage data stored in the memory 16 reaches a predetermined amount in the unsent state, when the number of times the battery 12 is charged reaches a predetermined number in the unsent state, or when a predetermined time period elapses in the unsent state. When the controller 15 determines that the predetermined condition is met in the unsent state, the controller 15 does not supply the charging enable command to the charger 11 regardless of the acquisition of the ID code of the charging apparatus 30 so that the charging apparatus 30 can be prohibited from charging the battery 12. Thus, even when the charging apparatus 30 does not have the communication function to communicate with the external server 40, it is possible to prevent the charging apparatus 30 from charging the battery 12 under a condition that the charging fee remains unpaid.

The electric vehicle 10 includes a report section 17. For example, the report section 17 can have a display section for displaying a message and a sound generator for reporting the message by an audible sound. The report section 17 notifies a user of a predetermined message in accordance with a message command from the controller 15. Before the predetermined condition is met in the unsent state, the controller 15 transmits the message command to the report section 17 so that the report section 17 can notify a user of a message saying that the charging fee remains unpaid. Thus, when a user just simply forgets to pay the charging fee, the report section 17 urges a user to pay the charging fee.

When the ID code and the electricity usage data, which remain unsent to the external server 40, remain stored in the memory 16, the ID code and the electricity usage data are sent through another charging apparatus 30 having the communication function to communicate with the external server 40 as shown in FIG. 2. In this case, when the information acquired from the charging apparatus 30 indicates that the charging apparatus 30 has the communication function to communicate with the external server 40, the controller 15 reads the ID code and the electricity usage data, which remain unsent to the external server 40, from the memory 16. Then, the controller 15 outputs the ID code and the electricity usage data to the communication device 14. Then, the communication device 14 sends the ID code and the electricity usage data to the external server 40.

The controller 15 supplies the charging enable command to the charger 11 after finishing sending the ID code and the electricity usage data to the external server 40, thereby allowing the charger 11 to charge the battery 12 of the electric vehicle 10 with power from the charging apparatus 30. Thus, the charging fee related to the ID code and the electricity usage data stored in the memory 16 can be surely paid.

Further, as shown in FIG. 2, when the charging apparatus 30 has the communication function to communicate with the external server 40, the ID code and the electricity usage data are sent from the charging apparatus 30 directly to the external server 40. That is, when the electric vehicle 10 is charged by the charging apparatus 30 having the communication function to communicate with the external server 40, there is no need that the ID code and the electricity usage data are stored in the memory 16 of the electric vehicle 10. However, if the electric vehicle 10 is configured such that a history of the charging and/or a history of the paid charging fee are stored in the memory 16, the ID code and the electricity usage data can be sent from the charging apparatus 30 to not only the external server 40 but also the communication device 14 of the electric vehicle 10.

A control process performed by the controller 15 of the electric vehicle 10 is described below with reference to FIG. 3. When the electric vehicle 10 enters a chargeable state where the electric vehicle 10 can be charged by the charging apparatus 30, the controller 15 performs the control process. For example, the electric vehicle 10 can enter the chargeable state, when the electric vehicle 10 is connected to the charging apparatus 30 through the charging cable.

The control process starts at S100, where the controller 15 determines, based on the information acquired from the charging apparatus 30, whether the charging apparatus 30 has the communication function to communicate with the external server 40. If the controller 15 determines that the charging apparatus 30 has the communication function corresponding to YES at S100, the control process proceeds to S110. In contrast, if the controller 15 does not determine that the charging apparatus 30 has the communication function corresponding to NO at S100, the control process proceeds to S140.

At S110, the controller 15 determines whether the ID code and the electricity usage data stored in the memory 16 remain unsent to the external server 40. If the controller 15 determines that the ID code and the electricity usage data stored in the memory 16 remain unsent corresponding to YES at S110, the control process proceeds to S120. In contrast, if the controller 15 does not determine that the ID code and the electricity usage data stored in the memory 16 remain unsent corresponding to NO at S110, the control process proceeds to S170.

At S120, the controller 15 sends the ID code and the electricity usage data stored in the memory 16 to the external server 40 through the communication device 31 of the charging apparatus 30. Then, at S130 following S120, the controller 15 updates an unsent history stored in the memory 16 by deleting the ID code and the electricity usage data, which were sent at S120, from the unsent history. If another history, such as an unpaid history, in association with the ID code and the electricity usage data, which were sent at S120, is stored in the memory 16, the controller 15 updates the other history at S130 as well as the unsent history. After S130, the control process proceeds to S170.

At S140, to which the control process proceeds if the controller 15 does not determine that the charging apparatus 30 has the communication function corresponding to NO at S100, the controller 15 determines whether the predetermined condition is met in the unsent state where the ID code and the electricity usage data stored in the memory 16 remain unsent to the external server 40. As mentioned previously, the predetermined condition can be met when the amount of electricity indicated by the electricity usage data stored in the memory 16 reaches a predetermined amount in the unsent state, when the number of times the battery 12 is charged reaches a predetermined number in the unsent state, or when a predetermined time period elapses in the unsent state. If the controller 15 determines that the predetermined condition is met in the unsent state corresponding to YES at S140, the controller 15 ends the control process shown in FIG. 3. In contrast, if the controller 15 does not determine that the predetermined condition is met in the unsent state corresponding to NO at S140, the control process proceeds to S150. At S150, the controller 15 determines whether the controller 15 acquires the ID code from the charging apparatus 30.

If the controller 15 does not determine that the controller 15 acquires the ID code from the charging apparatus 30 corresponding to NO at S150, the controller 15 ends the control process shown in FIG. 3. A reason for this is that the ID code is necessary for the payment process, which is performed later. In contrast, if the controller 15 determines that the controller 15 acquires the ID code from the charging apparatus 30 corresponding to YES at S150, the control process proceeds to S160. At S160, the controller 15 stores the ID code in the memory 16. After S160, the control process proceeds to S170.

At S170, the controller 15 outputs the charging enable command to the charger 11, thereby allowing the charger 11 to charge the battery 12 by power supplied from the charging apparatus 30. After S170, the control process proceeds to S180, where the controller 15 determines whether the controller 15 receives a charging completion notification from the charger 11. For example, the charger 11 can output the charging completion notification to the controller 15, when the battery 12 is fully charged or when a user performs an operation to stop charging the battery 12. If the controller 15 determines that the controller 15 receives the charging completion notification from the charger 11 corresponding to YES at S180, the control process proceeds to S190.

At S190, the controller 15 stores the electricity usage data indicative of the amount of electricity, which was used to charge the battery 12, in the memory 16 in association with the ID code which has been already stored in the memory 16. After S190, the control process proceeds to S200, where the controller 15 outputs a charging disable signal to the charger 11, thereby prohibiting the charger 11 from charging the battery 12.

As described above, according to the embodiment, the electricity usage data indicative of the amount of electricity used by a certain charging apparatus 30 to charge the battery 12 of the electric vehicle 10 is stored in the memory 16 of the electric vehicle 10 in association with the ID code of the certain charging apparatus 30. In such an approach, even when the certain charging apparatus 30 does not have the communication function to communicate with the external server 40, the electricity usage data and the ID code stored in the memory 16 can be sent to the external server 40 after the communication section 13 of the electric vehicle 10 can become able to communicate with the external server 40. Thus, the external server 40 can perform the payment process for the payment of the charging fee to charge the battery 12. Since it is not necessary that every charging apparatus 30 has the communication function to communicate with the external server 40, the widespread use of the charging apparatus 30 can be promoted.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

Figure 4:
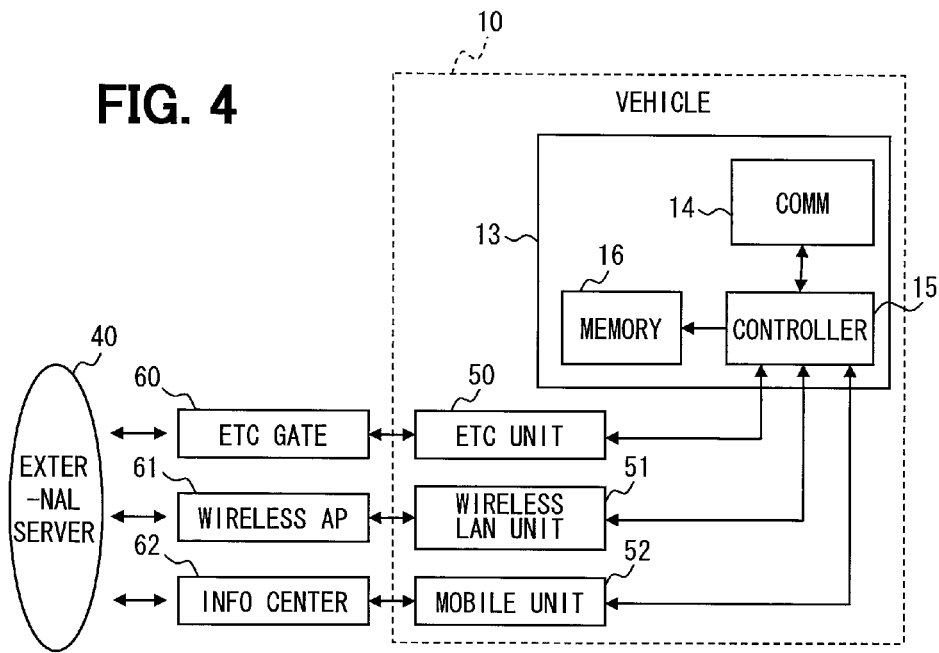
FIG. 4 is a block diagram illustrating a charging fee payment system according to a first modification of the embodiment.

In the embodiment, when the ID code and the electricity usage data, which are still unsent (i.e., unpaid), remains stored in the memory 16 of the electric vehicle 10, the communication section 13 of the electric vehicle 10 sends the ID code and the electricity usage data to the external server 40 through the charging apparatus 30 having the communication function to communicate with the external server 40. Alternatively, the communication section 13 can use a communication apparatus other than the charging apparatus 30 in order to send the ID code and the electricity usage data to the external server 40. For example, as shown in FIG. 4, when the electric vehicle 10 includes at least one of an electronic toll collection (ETC) unit 50 communicating with an ETC gate 60 capable of communicating with the external server 40, a wireless LAN communication unit 51 communicating with an wireless access point (AP) 61 capable of communicating with the external server 40, and a mobile communication unit 52 communicating with an information center 62 capable of communicating with the external server 40, the communication section 13 can send the ID code and the electricity usage data to the external server 40 through the at least one of the ETC unit 50, the wireless LAN communication unit 51, and the mobile communication unit 52.

Figure 5:
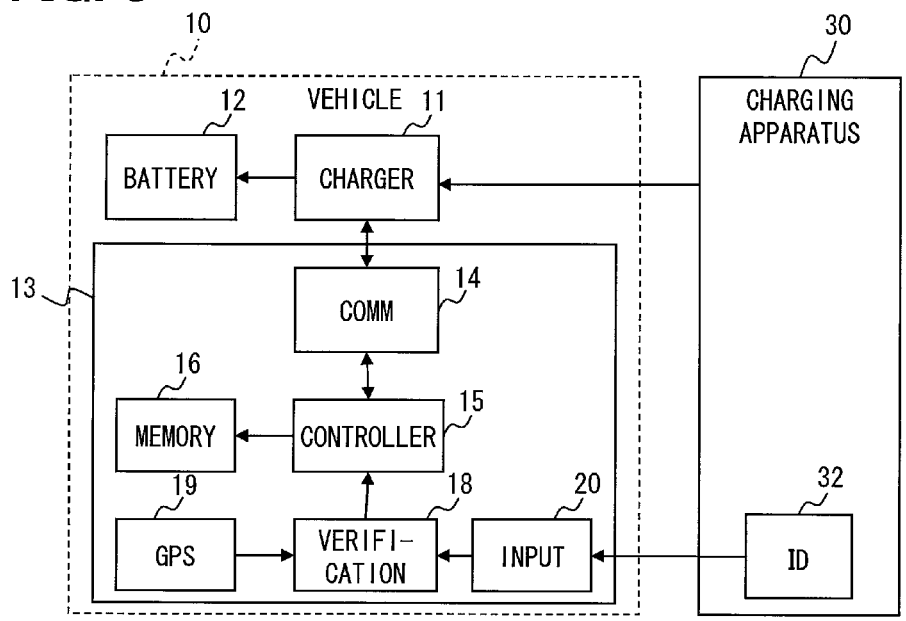
FIG. 5 is a block diagram illustrating a charging fee payment system according to a second modification of the embodiment.

In the embodiment, regardless of whether the charging apparatus 30 has the communication function to the external server 40, the charging apparatus 30 has the communication device 31 capable of communicating with the communication section 13 of the electric vehicle 10. Alternatively, as shown in FIG. 5, the communication device 31 can be removed from the charging apparatus 30 that does not have the communication function to the external server 40. In such an approach, the charging apparatus 30 that does not have the communication function to the external server 40 can be simplified.

In FIG. 5, a user inputs the ID code of the charging apparatus 30 to the electric vehicle 10 through an input section 20 of the communication section 13 in order to charge the battery 12 of the electric vehicle 10 with the charging apparatus 30. In such an approach, the charging apparatus 30 is identified so that the payment process for the payment for the charging fee can be performed later in the external server 40. For example, the charging apparatus 30 has a display section (not shown) for displaying the ID code stored in the ID code memory 32 to the user. The user can know the ID code of the charging apparatus 30 in another way. For example, the ID code can be printed on a surface of the charging apparatus 30.

As shown in FIG. 5, the communication section 13 can have a verification section 18 and a global positioning system (GPS) receiver 19 to prevent fraud related to an input of the ID code. The GPS receiver 19 detects the current position of the electric vehicle 10 and outputs the detected position to the verification section 18. A correspondence table between the location and the ID code of the charging apparatus 30 is prestored in the verification section 18. That is, the correspondence table data indicates where which charging apparatus 30 is located. When the ID code is inputted to the verification section 18 through the input section 20, the verification section 18 determines whether the charging apparatus 30 having the inputted ID code is located at the position detected by the GPS receiver 19 based on the correspondence table. If the verification section 18 determines that the charging apparatus 30 having the inputted ID code is located at the position detected by the GPS receiver 19, the verification section 18 outputs the ID code to the controller 15, and then the controller 15 stores the ID code in the memory 16.

Thus, only when the user inputs the correct ID code, the user is allowed to use the charging apparatus 30. Therefore, even when the charging apparatus 30 does not have the communication device 31, the correct ID code is acquired and stored in the memory 16 so that the payment process for the payment for the charging fee can be performed later in the external server 40.

For example, the controller 15 can encrypt the ID code and the used amount of electricity to be stored in the memory 16. In such an approach, it is possible to prevent the ID code and the electricity usage data stored in the memory 16 from being fraudulently rewritten or deleted. In this case, the controller 15 decrypts the ID code and the electricity usage data to be sent to the external server 40.

A target apparatus to be charged by the charging apparatus 30 is not limited to an electric vehicle.

What is claimed is:

1. A charging fee payment system used for a payment process for a payment of a charging fee to charge a target apparatus with a charging apparatus, wherein
the target apparatus includes a memory section, a charging allowing section, and a communication section,
when the charging apparatus has no communication with an external server that performs the payment process, the memory section receives and stores an unique identification (ID) code assigned to the charging apparatus and stores an amount of electricity used to charge the target apparatus,
the charging allowing section allows the target apparatus to be charged with the charging apparatus on a condition that the ID code remains stored in the memory section or the external server,
when the communication section becomes enable to communicate with the external server that performs the payment process, the communication section reads the ID code and the used amount of electricity from the memory and sends the ID code and the amount of electricity used, and
upon receiving the ID code and the amount of electricity used the external server performs the payment process based on the ID code and the amount of electricity used sent from the communication section or the charging apparatus, wherein the target apparatus is an electric vehicle having a rechargeable battery, and the charging apparatus is a charging station configured to charge the battery, the charging apparatus is located outside the vehicle, and when a predetermined condition is met in an unsent state where the ID code and the electric usage data stored in the memory section remain unsent to the external server, a controller prohibits the target apparatus from being charged with the charging apparatus, the target apparatus further includes a report section configured to notify a user of the target apparatus that the charging fee remains unpaid, while the controller maintains the charging allowing section to allow the target apparatus to be charged with the charging apparatus, before the predetermined condition is met in the unsent state.

2. The charging fee payment system according to claim 1, wherein
the predetermined condition is met when the amount of electricity indicated by the electric usage data stored in the memory section reaches a predetermined amount in the unsent state, when the number of times the target apparatus is charged reaches a predetermined number in the unsent state, or when a predetermined time period elapses in the unsent state.

3. The charging fee payment system according to claim 1, wherein
when the charging apparatus has the communication function to communicate with the external server, the communication section of the target apparatus communicates with the external server through the charging apparatus.

4. The charging fee payment system according to claim 3, wherein
when the electric usage data remains stored in the memory, the controller allows the target apparatus to be charged with the charging apparatus after sending the ID code and the electric usage data to the external server though the communication section.

5. The charging fee payment system according to claim 3, wherein
the charging apparatus sends the ID code to the target apparatus,
the target apparatus receives the ID code through the communication section, and
the memory section stores the ID code.

6. The charging fee payment system according to claim 1, wherein
the target apparatus includes a position detector, an input section, and a verification section,
the position detector detects a current position of the target apparatus,
the input section is operable by a user and allows the user to input the ID code in the target apparatus,
the verification section determines whether the charging apparatus having the inputted ID code is located at a position corresponding to the current position detected by the position detector, and
when the verification section determines that the charging apparatus having the inputted ID code is located at the position, the memory section stores the inputted ID code.

7. The charging fee payment system according to claim 1, wherein
the target apparatus further includes an encryption section configured to encrypt the ID code and the electric usage data, and
the memory section stores the ID code and the electric usage data encrypted by the encryption section.

8. The charging fee payment system according to claim 1, wherein
the memory section is a non-volatile memory.

9. A target apparatus used in a charging fee payment system for a payment process for a payment of a charging fee to charge the target apparatus with a charging apparatus, the target apparatus comprising;
a memory section configured to receive and store an unique identification (ID) code assigned to the charging apparatus and an amount of electricity used to charge the target apparatus when the charging apparatus has no communication with an external server that performs the payment process;
a charging allowing section configured to allow the target apparatus to be charged with the charging apparatus on a condition that the ID code remains stored in the memory section or the external server,
a communication section configured to read the ID code and the amount of electricity used from the memory and configured to send the ID code and the amount of electricity used, when the communication section becomes enable to communicate with the external server, wherein
resulting from receiving the ID code and the amount of electricity used the external server performs the payment process based on the ID code and the amount of electricity used sent from the communication section or the charging apparatus, and
when a predetermined condition is met in an unsent state where the ID code and the electric usage data stored in the memory section remain unsent to the external server, the controller prohibits the target apparatus from being charged with the charging apparatus, the target apparatus further includes a report section configured to notify a user of the target apparatus that the charging fee remains unpaid, while the controller maintains the charging allowing section to allow the target apparatus to be charged with the charging apparatus, before the predetermined condition is met in the unsent state, and the target apparatus is an electric vehicle having a rechargeable battery, and the charging apparatus is a charging station configured to charge the battery, the charging apparatus is located outside the vehicle.

10. The target apparatus according to claim 9, wherein
the predetermined condition is met when the amount of electricity indicated by the electric usage data stored in the memory section reaches a predetermined amount in the unsent state, when the number of times the target apparatus is charged reaches a predetermined number in the unsent state, or when a predetermined time period elapses in the unsent state.

11. The target apparatus according to claim 9, wherein
when the charging apparatus has the communication function to communicate with the external server, the communication section of the target apparatus communicates with the external server through the charging apparatus.

12. The target apparatus according to claim 11, wherein
when the electric usage data remains stored in the memory, the controller allows the target apparatus to be charged with the charging apparatus after sending the ID code and the electric usage data to the external server though the communication section.

13. The target apparatus according to claim 11, wherein
the charging apparatus sends the ID code to the target apparatus,
the target apparatus receives the ID code through the communication section, and
the memory section stores the ID code.

14. The target apparatus according to claim 9, wherein
the target apparatus includes a position detector, an input section, and a verification section,
the position detector detects a current position of the target apparatus,
the input section is operable by a user and allows the user to input the ID code in the target apparatus, the verification section determines whether the charging apparatus having the inputted ID code is located at a position corresponding to the current position detected by the position detector, and when the verification section determines that the charging apparatus having the inputted ID code is located at the position, the memory section stores the inputted ID code.

15. The target apparatus according to claim 9, wherein the target apparatus further includes an encryption section configured to encrypt the ID code and the electric usage data, and the memory section stores the ID code and the electric usage data encrypted by the encryption section.

16. The target apparatus according to claim 9, wherein the memory section is a non-volatile memory.

17. The charging fee payment system according to claim 1, wherein the charging apparatus has a communication device to communicate with the external server, when the charging apparatus is able to communicate with the external server, the communication device of the charging apparatus directly sends the ID code and the amount of electricity used to the external server, the charging allowing section allows the target apparatus to be charged with the charging apparatus on a condition that the ID code remains stored in the external server, and the external server performs the payment process based on the ID code and the amount of electricity used sent from the charging apparatus, when the charging apparatus fails to communicate with the external server, the communication device of the charging apparatus sends the ID code and the amount of electricity used to the memory section of the target apparatus, the charging allowing section allows the target apparatus to be charged with the charging apparatus on a condition that the ID code remains stored in the memory section, and the external server performs the payment process based on the ID code and the amount of electricity used sent from the communication section of the target apparatus, and the charging apparatus is always able to charge the target apparatus irrespective of a communication status between the communication device of the charging apparatus and the external server.

18. The charging fee payment system according to claim 1, wherein the communication section sends the ID code and the amount of electricity used to the external server only when the charging apparatus fails to communicate with the external server, and the charging apparatus directly sends the ID code and the amount of electricity used to the external server when the charging apparatus is able to communicate with the external server.

19. The charging fee payment system according to claim 1, wherein the charging apparatus has no communication device to communicate with the external server, the charging apparatus sends the ID code and the amount of electricity used to the memory section of the target apparatus, the charging allowing section allows the target apparatus to be charged with the charging apparatus on a condition that the ID code remains stored in the memory section, and the external server performs the payment process based on the ID code and the amount of electricity used sent from the communication section of the target apparatus.

20. The target apparatus according to claim 9, wherein the charging apparatus has a communication device to communicate with the external server, when the charging apparatus is able to communicate with the external server, the communication device of the charging apparatus directly sends the ID code and the amount of electricity used to the external server, the charging allowing section allows the target apparatus to be charged with the charging apparatus on a condition that the ID code remains stored in the external server, and the external server performs the payment process based on the ID code and the amount of electricity used sent from the communication device of the charging apparatus, when the charging apparatus fails to communicate with the external server, the communication device of the charging apparatus sends the ID code and the amount of electricity used to the memory section of the target apparatus, the charging allowing section allows the target apparatus to be charged with the charging apparatus on a condition that the ID code remains stored in the memory section, and the external server performs the payment process based on the ID code and the amount of electricity used sent from the communication section of the target apparatus, and the charging apparatus is always able to charge the target apparatus irrespective of a communication status between the communication device of the charging apparatus and the external server.

21. The target apparatus according to claim 9, wherein the communication section sends the ID code and the amount of electricity used to the external server only when the charging apparatus fails to communicate with the external server, and the charging apparatus directly sends the ID code and the amount of electricity used to the external server when the charging apparatus is able to communicate with the external server.

22. The charging fee payment system according to claim 1, wherein when a determination section (S100) determines that the charging apparatus does not have a communication function to communicate with the external server that performs the payment process, the memory section stores an unique identification (ID) code of the charging apparatus and electricity usage data indicative of the amount of electricity used by the charging apparatus to charge the target apparatus.

* * * * *